United States Patent
Rottkamp (10) Patent No.: US 11,897,504 B2
(45) Date of Patent: Feb. 13, 2024

(54) METHOD FOR ASSISTED OR AT LEAST SEMI-AUTOMATED DRIVING OF A MOTOR VEHICLE

(71) Applicant: AUDI AG, Ingolstadt (DE)

(72) Inventor: Lukas Rottkamp, Olching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/763,579

(22) PCT Filed: Aug. 3, 2020

(86) PCT No.: PCT/EP2020/071780
§ 371 (c)(1),
(2) Date: Mar. 24, 2022

(87) PCT Pub. No.: WO2021/073792
PCT Pub. Date: Apr. 22, 2021

(65) Prior Publication Data
US 2022/0332347 A1    Oct. 20, 2022

(30) Foreign Application Priority Data
Oct. 14, 2019   (DE) ............. 10 2019 127 541.5

(51) Int. Cl.
*B60W 60/00*   (2020.01)
*B60W 40/02*   (2006.01)
(Continued)

(52) U.S. Cl.
CPC ........ *B60W 60/0011* (2020.02); *B60W 40/02* (2013.01); *B60W 50/0097* (2013.01);
(Continued)

(58) Field of Classification Search
CPC ......... B60W 60/0011; B60W 60/0057; B60W 40/02; B60W 50/0097; B60W 50/14; B60W 2556/50; H04W 4/40
(Continued)

(56) References Cited

U.S. PATENT DOCUMENTS 10,311,652 B2   6/2019   Stefan et al.
10,725,467 B2   7/2020   Meier
(Continued)

FOREIGN PATENT DOCUMENTS

DE   102013202405 A1   8/2014
DE   102013206746 A1   10/2014
(Continued)

OTHER PUBLICATIONS

Kai et al., "A Modular Software Framework for Autonomous Vehicles," 2018, Publisher: IEEE.*
(Continued)

*Primary Examiner* — Tuan C To
(74) *Attorney, Agent, or Firm* — Sterne, Kessler, Goldstein & Fox P.L.L.C.

(57) ABSTRACT

The present disclosure relates to a method of driving a motor vehicle. The method determines position data relating to at least one of a current position or a predicted future position of the motor vehicle detecting, using at least one sensor device, surroundings data relating to a surrounding environment of the motor vehicle, determining at least one driving intervention based on the surroundings data, and controlling at least one vehicle system of the motor vehicle to execute the determined at least one driving intervention. The at least one driving intervention executed by a selected software module that is selected based on the surroundings data, and the selected software module is selected from a plurality of software modules based on the position data. Each software (Continued)

module is configured to execute the at least one driving intervention.

8 Claims, 2 Drawing Sheets

(51) Int. Cl.
    *B60W 50/00*     (2006.01)
    *B60W 50/14*     (2020.01)
    *H04W 4/40*     (2018.01)

(52) U.S. Cl.
    CPC ........ *B60W 50/14* (2013.01); *B60W 60/0057* (2020.02); *H04W 4/40* (2018.02); *B60W 2556/50* (2020.02)

(58) Field of Classification Search
    USPC .......................................................... 701/23
    See application file for complete search history.

(56) References Cited

U.S. PATENT DOCUMENTS

| | | | |
|---|---|---|---|
| 11,407,410 B2 * | 8/2022 | Rosenbaum | G05D 1/0088 |
| 2008/0086241 A1 * | 4/2008 | Phillips | G05D 1/0038 701/2 |
| 2018/0300565 A1 * | 10/2018 | Qin | G08G 1/09623 |
| 2018/0312161 A1 | 11/2018 | Asakura et al. | |
| 2019/0025063 A1 * | 1/2019 | Eigel | B60W 50/0097 |
| 2019/0202473 A1 * | 7/2019 | Kaji | B60W 50/12 |
| 2019/0212736 A1 * | 7/2019 | Jang | B60W 30/00 |
| 2019/0265060 A1 * | 8/2019 | Han | G06N 3/084 |
| 2019/0294427 A1 | 9/2019 | Kassner et al. | |
| 2019/0329791 A1 * | 10/2019 | Oba | B60K 28/063 |
| 2019/0339085 A1 * | 11/2019 | Naef | G01C 21/26 |
| 2021/0103401 A1 * | 4/2021 | Kraemer | G06F 3/0655 |
| 2022/0046722 A1 * | 2/2022 | Kim | H04L 5/0048 |

FOREIGN PATENT DOCUMENTS

| | | | | |
|---|---|---|---|---|
| DE | 102015226184 | A1 | 6/2017 | |
| DE | 102016224411 | A1 | 6/2018 | |
| DE | 102016225848 | A1 | 6/2018 | |
| EP | 2214121 | A1 | 8/2010 | |
| WO | WO-2008060689 | A2 * | 5/2008 | ............ F41H 7/005 |
| WO | WO-2018211488 | A1 * | 11/2018 | ........ B60W 60/0011 |
| WO | WO-2019017215 | A1 * | 1/2019 | ............. B60K 35/00 |

OTHER PUBLICATIONS

International Preliminary Report on Patentability directed to related International Patent Application No. PCT/EP2020/071780, dated Apr. 19, 2022, with attached English-language translation; 14 pages.
International Search Report and Written Opinion of the International Searching Authority directed to related International Patent Application No. PCT/EP2020/071780, dated Dec. 8, 2020, with attached English-language translation; 19 pages.

* cited by examiner

METHOD FOR ASSISTED OR AT LEAST SEMI-AUTOMATED DRIVING OF A MOTOR VEHICLE

TECHNICAL FIELD

The present disclosure relates to a method for assisted or at least semi-automated driving of a motor vehicle, wherein position data relating to a current or predicted future position of the motor vehicle are determined, after which surroundings data relating to the vehicle surroundings are detected by at least one sensor device, at least one driving intervention is determined based on the surroundings data, and at least one vehicle system for carrying out the driving intervention is controlled. The present disclosure also relates to a motor vehicle.

BRIEF SUMMARY

Functions for assisted or at least semi-automated driving of motor vehicles are becoming increasingly important. In the case of assisted driving, typically only longitudinal or lateral driving of the motor vehicle is carried out on the vehicle side, while the remaining driving tasks remain with the driver. Corresponding assistance systems are, for example, distance assistants or lane departure warning systems. In the case of at least semi-automated driving, i.e. in the case of higher autonomy levels according to the level classification of the Federal Highway Research Institute or the SAE J3016 classification, the entire driving operation is controlled by vehicle-side systems. In the case of a partial automation, the vehicle driving operation is only carried out by the vehicle itself in special driving situations, for example when using a parking assistant, and the driver must constantly monitor driving operations; such permanent monitoring is no longer necessary for the higher automation levels. In the case of conditional automation, it is necessary for a driver to respond to system requests within a defined period of time and, for example, take over driving the vehicle again. In the case of high automation, on the other hand, the vehicle can be put into a safe operating state even if the driver does not react appropriately to corresponding system requests. In the case of full automation, the driving tasks can be carried out without any driver involvement, and even a driver-less trip is possible.

In the case of an increasing degree of automation, it becomes necessary for vehicles to be able to handle a wide variety of traffic situations, ambient and surroundings conditions, in particular with all conceivable ones in a usage region, without human intervention being necessary. As a result, very complex programs are required for recognizing the traffic area and for trajectory planning. In addition, high security requirements have to be met, and protecting correspondingly complex programs are very expensive. In particular, even small changes to the program can result in a plurality of or even all tests having to be repeated to ensure robust program behavior. Unintended results of changes can also occur, for example that the behavior in other operating situations is worsened or specific critical tests are no longer passed due to a change that is intended to achieve improved behavior in specific operating situations, which means that a corresponding change cannot be made to the program or can only be made with considerable additional effort.

It is known from DE 10 2018 221 924 A1 to adjust a distance from the preceding vehicle in an autonomous driving system based on the geographic location and the type of road being traveled on. In this case, distances that are typically maintained on a corresponding road are statistically detected in order to determine a suitable distance for the road being traveled on. However, changing individual parameters of a vehicle's driving is not enough to adapt the driving behavior to the large number of expected traffic situations, ambient conditions, and surroundings conditions that can occur when driving the vehicle. Therefore, a very complex program for vehicle driving is still required.

DETAILED DESCRIPTION

The present disclosure is based on the object of specifying an option for reducing the development and testing effort for methods for assisted or at least semi-automated driving of motor vehicles, with which, in particular, high degrees of automation can also be achieved with reasonable development effort.

The object is achieved according to the present disclosure by a method of the type mentioned at the outset, wherein the determination of the driving intervention is carried out by a selected software module based on the surroundings data, which software module is selected from a plurality of software modules that can potentially be used for this purpose based on the position data.

Within the scope of the present disclosure, it was recognized that assisted or at least semi-automated driving of a motor vehicle for a specific local traffic situation can be implemented considerably more easily than driving that is intended to handle any traffic situation. It is therefore proposed to select a software module to be used at a specific position for all traffic situations instead of a monolithic software program, as a result of which the individual software modules have a significantly lower complexity than a monolithic program for driving the motor vehicle. For example, specific software modules can be used to drive the motor vehicle on highways, to drive it on country roads, to drive it through the area of a complex intersection, to drive it through closed smaller towns, etc. As will be explained later, the software module can also be selected depending on the weather and/or time of day, for example, so that separate software modules can also be used, for example, for trips at night or trips during rush hours or trips on wet, icy, or snow-covered roads.

Since the individual software module can thus be tailored to the specific surroundings or surroundings conditions and to the traffic situation to be expected, the same quality of driving can be implemented with significantly less program complexity than a driving program suitable for all situations, or the driving quality can be improved with the same program complexity.

The software modules are preferably self-contained modules having a defined input interface, via which the surroundings data are detected, and having a defined output interface, via which data relating to the driving intervention are output. The individual software modules are therefore transparent to the surrounding program structure, so that a change in the software module used preferably does not require any further program changes. Preferably, only exactly one of the software modules is used in a given situation and the other software modules are only used when they are selected as the selected software module.

The software modules can in particular comprise functions for recognizing the traffic area from the surroundings data and for trajectory planning based thereon. The handling data can be sensor data from, in particular, motor vehicle-side sensor devices. However, it can also be processing data that were obtained from such sensor data by preprocessing. For example, the surroundings data can provide an environment model determined from sensor data, or preparatory processing steps for scaling, standardization, and registration of sensor data from a number of sensors can take place, or the like.

The software modules can be stored in particular on a data carrier or in a database in the motor vehicle. They can be loaded as required, so that, for example, only the selected software module is loaded. Alternatively, a plurality of software modules can be available for immediate execution and it can be selected as required which of these software modules is used to provide the driving intervention. As will be explained later, it is also possible to reload parts or all of the software modules as required from a vehicle-external device.

The sensor device can in particular be an imaging sensor device and/or can be used to measure distances. For example, a camera, a lidar sensor, a radar sensor, and/or an ultrasonic sensor can be used as the sensor device or as one of the sensor devices. The sensor device, the controlled vehicle system, and/or a processing device that is used to execute the selected software module can be part of the motor vehicle. The driving intervention can be used in particular for fully automated driving of the motor vehicle. However, only partial driving, for example pure longitudinal driving or pure lateral driving, of the motor vehicle can also take place. Various degrees of automation that can be used within the scope of the automated method have already been explained at the outset.

By using specific software modules for specific positions or driving situations dependent on these, the effort required to develop and validate programs for driving self-driving vehicles can be significantly reduced. In particular, it was recognized that the complexity of a program that is intended to determine driving interventions for a large number of situations increases sharply with an increasing number of situations to be taken into account, which can be avoided by dividing the driving operation in different situations between different software modules.

The individual software module only has to be designed for individual locations or types of locations and secured only for these. This also makes it possible to make self-driving vehicles available on the market more quickly, since it is not necessary to cover the entire road network from the start. Programs for determining driving interventions in specific parts of the road network can continue to be used as software modules for these parts without requiring a new development or adaptation to other situations. By dividing the vehicle driving operation into different software modules, the software modules can also be developed independently of one another, for example by a plurality of development teams or even different manufacturers.

A probable route type and/or a probable traffic situation can be determined at the position based on the position data, wherein the selected software module depends on the probable route type and/or the probable traffic situation. In order to allow such a classification, map data can be used, for example. In this case, route types are typically already assigned to various route segments on map data used, for example, in navigation systems, i.e., for example, information as to whether it is a highway, a country road, or an urban route. Special local traffic situations, such as intersections, junctions, and the like, can also be recognized in map data. In addition, the probable route type or the probable traffic situation can also depend on additional information that is received, for example, via radio, a mobile radio network, the Internet, or the like. For example, traffic jam reports, the current time, the day of the week, and the like can be taken into account in order to predict, for example, weather conditions, a time of day, for example with regard to the presence of commuter traffic or trips at night, or the like.

With regard to the route type or the traffic situation, a distinction can be made between standard situations and special situations. In standard situations, for example, a software module can be used that is suitable for a large number of different but relatively simple driving situations, i.e. an "all-rounder." Special software modules can be used for special situations, such as unclear intersections, driving in inner cities, off-road operation, driving on icy roads or in the dark, or the like.

It is possible here for the same software module to be used for a specific traffic situation and/or a specific route type. In some cases, however, it can also be advantageous to use a special software module for specific positions, for example specific individual intersections or the like, or for driving in a closed region, for example in a multi-story car park.

The driving intervention can be determined by a processing device of the motor vehicle, wherein the selected software module is called up by a vehicle-external device via a wireless communication connection prior to the determination of the driving intervention. For example, calling up can take place via a mobile radio network, but also via other networks, for example via a Car2X connection. The vehicle-external device can be, for example, a backend server of the vehicle manufacturer or another server.

The software modules can be provided free of charge in general or for users of a specific vehicle type or for users of vehicles from a specific vehicle manufacturer. Alternatively, provision can only be made for vehicles or users who have purchased a corresponding license. In this case, it is possible that, in principle or if a corresponding license is available, all the software modules present on the vehicle-external device are made available to the motor vehicle, i.e. can be downloaded if required, for example. However, it is also possible that a corresponding license only applies to a subset of the software modules or to individual software modules. In this case, it may be possible, for example, to provide packages for specific operating situations, i.e. for example, exclusively for driving on highways and country roads or also exclusively for driving in city traffic. However, it is also possible that the use of all software modules for a specific area is re-leased for a vehicle or a specific user. For example, an "autonomous driving in Ingolstadt" package can be offered that provides all the modules required for an autonomous driving operation in Ingolstadt.

When connecting to the vehicle-external device or when calling up a corresponding software module, the corresponding motor vehicle or a user of the motor vehicle can be identified or authenticated, for example to ensure that this user is authorized to use this software module or that the motor vehicle may access this software module. A conesponding identification or authentication can also be used to process payment transac-tions, for example if the user spontaneously wants to buy a specific software module or a group of software modules as part of route planning or in a specific driving situation.

In principle, it is possible to call up the selected software module from the vehicle-external device only during its selection for the current position. However, in order to allow the assisted or semi-automated driving to react quickly to a changed driving situation and to be independent of the connection quality of the wireless communication, it can be advantageous to predict future driving operation of the motor vehicle or to plan a route to be traveled in the future, for example with help of a navigation system. Appropriate approaches are known in principle in the prior art and will not be explained in detail. In this case, a corresponding software module can be called up by the vehicle-external device and stored in a local memory of the motor vehicle even before a corresponding predicted future position is reached. It can remain there permanently or it is also possible to call up software modules again when planning a new route, for example in order to be able to always provide current versions or to ensure that appropriate licenses are available.

A future route for the motor vehicle can be planned or predicted, with the predicted future position lying on this route. As already mentioned above, route planning, for example, to a defined destination, can take place as is known in principle in the prior art. In this case, the route planning can also be done interactively. In the case of conventional navigation systems, this is used, for example, to select between a particularly fast route, a particularly energy-saving route or a scenically attractive route. As will be explained in more detail later, it can also be taken into account how far suitable software modules are available for a planned route, in order to allow assisted or semi-automated driving that is as continuous as possible on this route. Such a route planning can take place, for example, before the start of the trip or also during the trip.

In principle, it is also known to determine a probable route without a predeter-mined destination. For example, based on a current driving situation and a statistical evaluation of the right of way of the same motor vehicle or the same user, a prognosis can be made with regard to the route sections that will be traveled in the future. Such a predic-tion of a future route and thus future positions on the route can be used in particular to check at an early stage whether a suitable software module for assisted or semi-automated driving of the motor vehicle is available at a corresponding position or whether it should be called up, for example by a vehicle-external device, a user should be asked whether a corre-sponding license should be purchased, information should be given to the user that he has to drive the motor vehicle without assistance or manually, external help should be requested, for example remote control of the vehicle or an external driver boarding, or similar.

If the software module is selected based on a predicted future position, it is possible in particular to only use this software module to process the surroundings data or for the determination of the driving intervention, when the motor vehicle has reached this position or has entered a region assigned to the position, for example has fallen below a pre-determined minimum distance from the position or has reached a route type assigned to the position, for example an intersection, a country road, a highway or the like.

A selected software module can in each case be selected for a predicted future position or a plurality of predicted future positions on the route, wherein the at least semi-automated driving operation of the motor vehicle along the route starts always or only if a waiting condition is fulfilled, the fulfillment of which depends on a current and/or pre-dicted connection quality of the wireless communication connection when all selected software modules are called up from the vehicle-external device and/or are stored locally in the motor vehicle. In particular, the route can be planned or predicted before the start of the trip or at least before the start of the assisted or at least semi-automated driving operation. By waiting until all the selected software modules have been called up or stored locally, it is ensured that, regardless of the connection quality of the wireless communication connec-tion, all the required software modules are available, and the vehicle can therefore be driven in an assisted or at least semi-automated manner along the entire route or at least along sections of the route for which the corresponding software modules can be used. If, on the other hand, it is known that a good connection quality can also be expected within the framework of the driving, at least on sections of the route, the driving operation can already begin before all software modules have been called up or stored locally. The remaining software modules can then be reloaded during the driving operation.

In the event that only a subset of available software modules from the potentially usable software modules is available for driving the motor vehicle, the route can be planned based on the available software modules. For example, it may be possible in specific driving situations that a wireless communication connection to the vehicle-external device is interrupted, so that only the locally stored software modules are available for driving the motor vehicle. It may also be possible that there are no licenses for parts of the potentially usable software modules or the like for a specific motor vehicle or a specific user, so that these cannot be used or can only be used to a limited extent. In this case, the route can be planned in such a way, for example, that suitable software modules are available along the entire route or at least over the largest possible parts of the route, in order to implement assisted or at least semi-automated driving of the motor vehicle. In other words, when planning the route, positions can be avoided for which no software modules or only conditionally suitable software modules are available, which, for example, only allow driving at walking speed or otherwise restricted driving operation.

As is known in principle from the field of navigation systems, various factors can be taken into account when planning a route, so that, for example, an attempt can be made simultaneously to achieve the lowest possible fuel consumption and the lowest possible time consumption of the route, wherein a different weighting of the various optimization factors can be made based on the user inputs. Accordingly, within the scope of the method according to the present disclosure, it may be possible to allow a user to choose to what extent a greater distance, driving time, or greater fuel consumption is acceptable in order to allow the greatest possible assistance or semi-automated driving of the motor vehicle. For example, various planned routes can be visualized for a user, with segments where manual driving is likely to be required, e.g. can be highlighted in color.

In cases in which not all software modules are available, for example because a corresponding license is missing, it is also possible for a user to be given the option to purchase corresponding licenses directly via a user interface of the motor vehicle. For example, a user can be given the choice of whether he accepts a detour, would like to use a shorter route, in which case he would have to do without assisted or at least semi-automated driving of the motor vehicle on a section of the route, or would like to acquire a corresponding license with which the assisted or at least semi-automated driving of the motor vehicle is also possible on the complete direct route or at least for a larger part of this route.

Alternatively or additionally, it is also possible to take into account a predicted connection quality for the wireless communication connection when planning the route. For example, it is possible that no optimal software module is available for at least one section of an optimal route to determine driving interventions for this, since this software module is not stored locally and the wireless connection to the vehicle-external device on which this software module is stored is disrupted at the current vehicle position. In some cases, it may be possible to plan the route in such a way that, before reaching a position for which the suitable software module is not available, a region with a presumably high connection quality is traversed, so that the corresponding software module can be reloaded in good time.

If an intervention condition is met, which indicates that the software module selected for at least one position on the route is not available and/or that none of the potentially usable software modules is optimally suited for this position, a notification device can be controlled to alert a user that a manual driving operation of the motor vehicle is required at this position and/or a request for assistance can be sent to the or another vehicle-external device, and/or a predefined fallback software module can be selected for this position.

The activation of the notification device can be used to inform a user that he must promptly drive the vehicle manually, since there is no suitable software module available for a route section ahead. If a software module is not available due to a lack of licenses, for example, this notice can also be used to allow a user to purchase a corresponding license. In a particularly preferred manner, however, a corresponding notice can already be provided as part of route planning. For example, when the planned route is visualized, route sections in which manual driving operation is required can be colored with a specific color that differs from route sections with assisted or at least semi-automated driving. As already explained above, it is also possible for the user to be able to choose between different routes. In this case, too, it can already be pointed out that manual driving is required on specific routes or on parts thereof.

A request for assistance can, for example, request remote control of the motor vehicle by the additional device or vehicle-external devices. In this case, it is possible, for example, for operating personnel who remotely control the vehicle to be present at the corresponding vehicle-external device. However, it is also possible for the vehicle-external device to provide an algorithm for driving the motor vehicle in specific situations, which cannot be carried out in the motor vehicle itself for certain reasons, for example due to a high computing effort.

The request for assistance can also be a request from a driver getting into the vehicle himself. For example, the vehicle can be driven as part of the route on which it is driving to a specific position where a driver gets on who takes over driving the vehicle in sections of the route for which no suitable software module is available.

A fallback software module can in particular be a software module that is in principle suitable for driving the motor vehicle in a large number of driving situations, but can only be operated with specific restrictions due to its less than optimal suitability, for example with a limited maximum speed of the motor vehicle, for example walking speed. In particular, it is possible in this case for a user to be given the option, while using the fallback software module, to take over driving the vehicle himself in order to be able to traverse the correspondingly critical route section more quickly.

A quality condition can be evaluated by a monitoring software module, the fulfillment of which depends on the driving interventions determined by the selected software module and/or on diagnostic information provided by the selected software module. The use of software modules for certain positions or route types or traffic situations allows robust and high-quality driving with relatively simple software modules. Nevertheless, it can be advantageous to additionally monitor the software modules for diagnostic pur-poses using a monitoring software module. The monitoring software module can recognize, for example, when driving interventions take place abruptly or when undesired or even critical driving situations occur. Additional sensor data, for example the data from distance sensors, can also be evaluated for this purpose.

If the quality condition is not met, corresponding information can be collected, for example, and made available to a manufacturer of the software module or of the motor vehicle. There, an evaluation can be carried out as to whether better control was indeed not possible in the driving situation or whether the software module can be further developed and improved. It would also potentially be possible to select a different software module or to ask a user to take over the driving operation manually if the quality condition is not met.

In order to further improve the quality monitoring by the monitoring software module, the software modules can provide diagnostic information to the monitoring software module via a defined interface. For example, the diagnostic information can be a detection accuracy with regard to objects detected in the environment surrounding the motor vehicle, results of intermediate steps in the detection of the traffic area or trajectory planning, object classes of specific objects recognized in the vehicle environment, distances to objects, and the like. These sizes can for example be validated by the monitoring software module to check the correct functioning of the software module.

The selected software module can also be selected based on a specified travel destination and/or a current or predicted travel direction of the motor vehicle. This consider-ation can take place as part of the route planning explained above or also be independent thereof.

In addition to the method according to the present disclosure, the present disclosure relates to a motor vehicle that is set up to carry out the method according to the present disclosure. The motor vehicle preferably comprises a sensor device for detecting the sensor data and/or a position detecting device for detecting the current position or to recognize that a predicted future position or an assigned region has been reached. The motor vehicle can have a processing device that executes the corresponding selected software module and is therefore set up to determine the driving intervention based on the surroundings data. The processing device can be set up to select the selected software module from the potentially usable software modules based on the position data.

The motor vehicle according to the present disclosure can also be further developed with the further features explained for the method according to the present disclosure with the advantages mentioned there and vice versa.

Further advantages and details of the present disclosure will become apparent from the following drawings and the accompanying embodiments.

Figure 1:
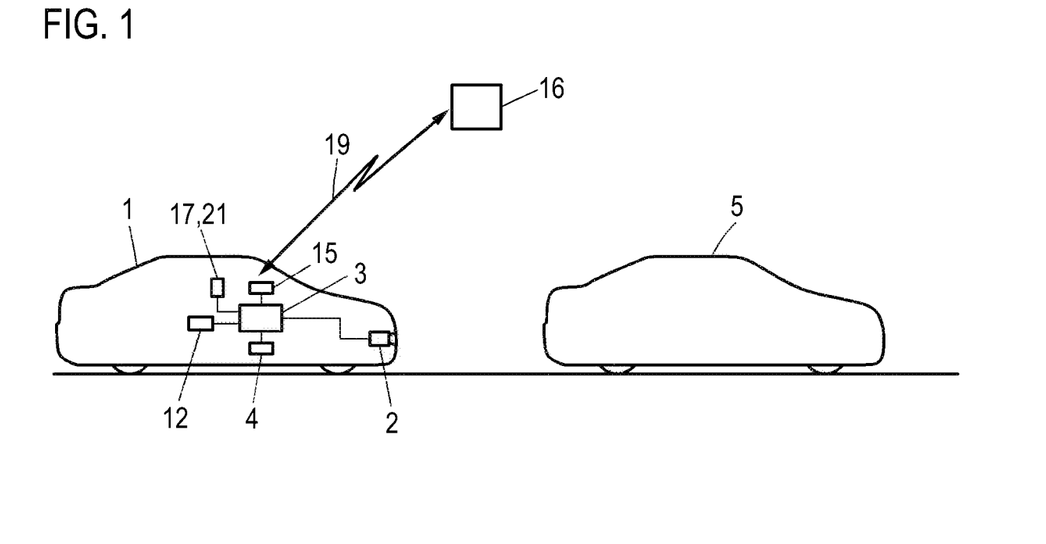
FIG. 1 shows an embodiment of a motor vehicle according to the present disclosure, through which an embodiment of the method according to the present disclosure is carried out.

FIG. 1 shows a motor vehicle 1 that is set up for automated or at least assisted driving. For this purpose, the motor vehicle 1 has a processing device 3 which processes surroundings data detected by at least one sensor device 2 of the motor vehicle 1 and determines driving interventions based thereon in order to control vehicle systems 4 of the motor vehicle 1. In this case, the motor vehicle can be driven substantially without intervention by the driver, but the driving can also take place in such a way that, for example, only longitudinal or transverse driving of the motor vehicle 1 takes place.

FIG. 1 shows a relatively simple driving situation, in which the motor vehicle 1 follows the vehicle 5. However, if automated or at least assisted driving interventions should also be possible in complex driving situations, for example when traversing an intersection in an inner-city area, and if a large number of different driving situations should be handled, i.e. not only an inner-city trip but also a trip on highways and country roads or within closed areas, or if a trip is also to take place under different light and weather conditions, relatively complex programming of the processing device 3 would be required for carrying out robust driving in all these driving situations. In order to avoid this, as will be explained in more detail below with reference to FIG. 2, various software modules are used in the motor vehicle 1, one of which is selected as required in order to process the surroundings data detected by the sensor device 2 and to determine a driving intervention to be carried out.

Figure 2:
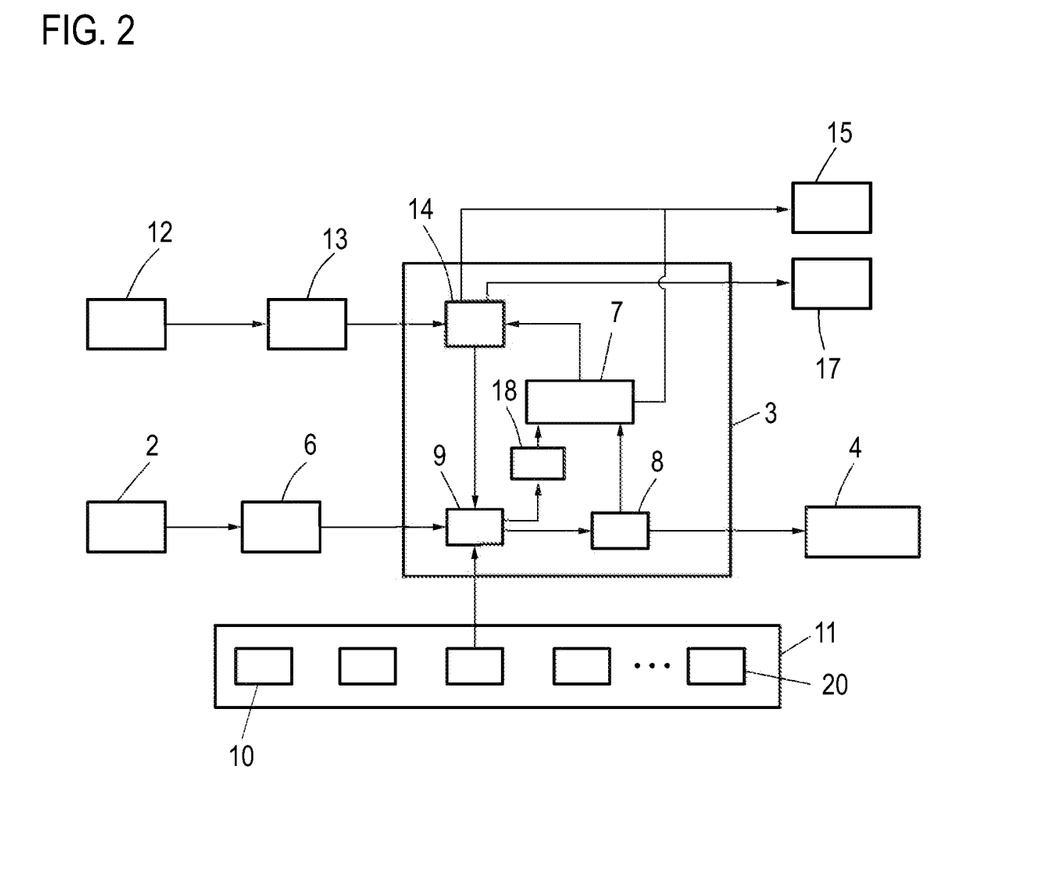
FIG. 2 shows the data processing in the embodiment of the method according to the present disclosure explained with reference to FIG. 1.

As shown in FIG. 2, the surroundings data 6 provided by the sensor device 2 are processed by a selected software module 9 in order to determine the driving intervention 8 according to which the vehicle system 4 is controlled. The software module 9 is selected by a selection algorithm 14 from a large number of potentially usable software modules 10, which are stored, for example, in a database 11 in the motor vehicle 1 itself or in a vehicle-external device 16, from which they can be called up via a communication device 15 of the motor vehicle 1.

In order to determine which of the potentially usable software modules 10 is particularly well suited for the current driving operation or for driving operation in a time interval ahead, position data 13 are provided by a navigation system 12 or another position determination device, on the basis of which the selection algorithm 14 determines the selected software module 9 from the potentially usable software modules 10. In the following, it is initially assumed that the position data 13 relate to the current position of the motor vehicle 1. However, it is also possible for the position data 13 to relate to a predicted future position, as will be explained in more detail later with reference to FIG. 3.

The individual potentially usable software modules can each be assigned to positions or regions in which they are to be used. However, the potentially usable software modules 10 are particularly preferably assigned to different route types and/or traffic situations. For example, by virtue of map data that can specify the type of route for each position, and optionally by virtue of additional information, such as weather conditions, a time from which a traffic situation can be derived, for example, roadworks and/or traffic jam reports and the like, the selection algorithm 14 can determine a route type that is likely to be present and a traffic situation that is likely to be present and, based thereon, select a suitable software module of the software modules 10 that is particularly suitable for this route type and this traffic situation.

The selected software module 9 can then be loaded into a memory of the processing device 3 and can receive the surroundings data 6 via a defined input interface and output the driving intervention 8 to the vehicle system 4 via a defined output interface. It is thus possible in the method explained or in the motor vehicle 1 to select a software module 9, 10 that is tailored to the specific driving situation in order to carry out the vehicle driving. As a result, high-quality vehicle driving can already be achieved with software modules 9, 10 with relatively little complexity.

In some situations, it may be possible that only a subset of available software modules 10 from the potentially usable software modules 10 is available. This can be the case, for example, if only parts of the potentially usable software modules 10 are stored in the motor vehicle 1 itself and the other software modules 10 in the vehicle-external device 16, with the wireless communication connection 19 being disrupted. In this case, if one of the unavailable software modules 10 is selected as the selected software module 9, it cannot be used. Thus, there is potentially no software module 9, 10 available with which robust driving of the motor vehicle 1 is readily possible. There are a number of ways to respond to such a situation.

If it is determined during the planning of a route that no suitable software module is available for a specific position or a specific section of the route, the route can be planned based on the software modules 9, 10 that are actually available. For example, a detour can be accepted in order to avoid traversing such a route section. In addition or as an alternative, the route can be adapted in such a way that, before a corresponding route section is reached, a route section with an expected good connection quality is traversed in order to allow a corresponding software module to be called up via the communication device 15.

Another possible reaction to the non-existence of a suitable software module for the current or a predicted future position is to send a request for assistance to the vehicle-external device 16 or to another vehicle-external device that is not shown. This can be used to remotely control the motor vehicle 1 via the other vehicle-external device. For example, an assistant can remotely control the motor vehicle there using a screen and a steering system provided there, or the like. It would also be possible for a vehicle-external device 16 to be able to carry out more complex software algorithms than the processing device 3, so that a corresponding remote control can be selected in specific operating situations. In principle, it is also possible to send a request for assistance to an external driver, e.g. to his mobile phone, so that he can get on at a defined position of the route and can drive the vehicle through the critical route section.

In the event that no optimally suitable software module 9, 10 is available, it is also possible that a fallback software module 20 is selected, which can be a software module, for example, that is suitable for controlling the motor vehicle 1 in a large number of driving situations. Since it is not optimally suited for driving the motor vehicle, it can be operated with specific restrictions. For example, the maximum driving speed can be limited to walking speed or something similar.

The smooth functioning of the corresponding selected software module 9 can be monitored by the monitoring software module 7. For this purpose, the monitoring software module 7 can, on the one hand, evaluate the driving instruction 8, for example in order to recognize abrupt driving interventions. On the other hand, diagnostic information 18 can be evaluated which the selected software module 9 can provide via a defined interface. For example, these can relate to recognition accuracies, results of intermediate steps, object classes, distances and the like.

If it is recognized that the selected software module 9 does not function optimally, the collected data can be made available to the manufacturer of the software module 9 via the communication device 15 in order to allow the software module 9 to be improved. In addition, in cases in which a quality condition is not met, the selection algorithm 14 can also be triggered under specific circumstances in order to select another software module 10 as the selected software module 9. If no other suitable software module 10 is available, a corresponding message can be output via the message device 21 of the user interface 17 in order to notify a user of the need for manual driving of the motor vehicle 1, or a request for assistance can be sent to the or another vehicle-external device 16, in order, as explained above, to request an external driver or remote control of the motor vehicle 1.

Figure 3:
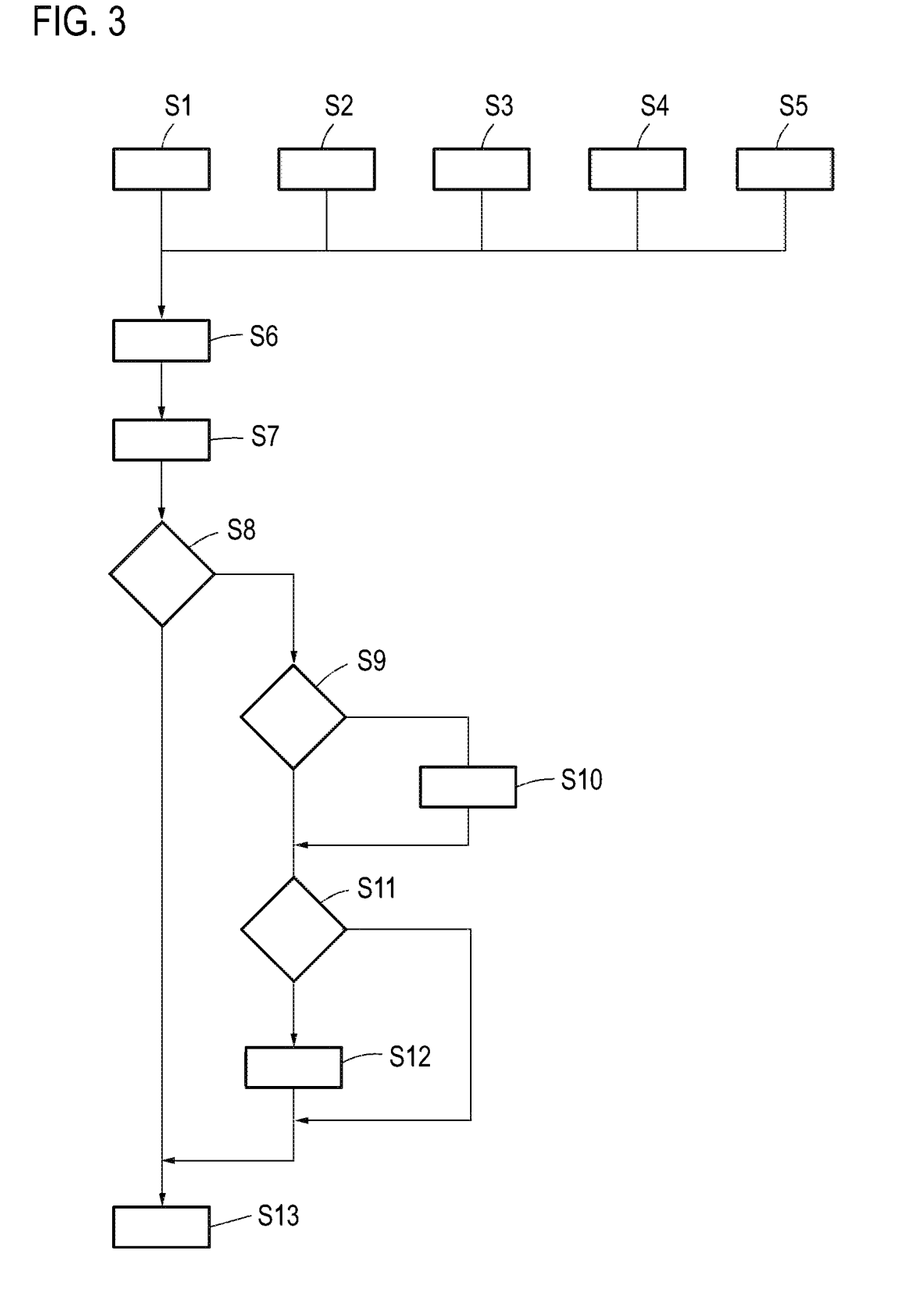
FIG. 3 is a flow diagram of a further embodiment of the method according to the present disclosure.

FIG. 3 shows a flow chart of a further method for assisted or at least semi-automated driving of a motor vehicle, wherein, in the embodiment shown, a route is calcu-lated before the start of the trip or at least before the start of the assisted or at least semi-automated driving of the motor vehicle and a selected software module is selected in each case for a number of predicted future positions of the route. In this case, the position of the motor vehicle is first detected in step S1, for example using a navigation system. In step S2, a desired destination is detected, for example based on a user input from a user at the user interface. In step S3, it is checked which of the potentially usable software modules are stored locally in the motor vehicle, for example in a database. In step S4, the potentially usable software modules are also determined, which can be used without further restrictions if communication with the vehicle-external device is possible. In step S5, those software modules are also determined which could potentially be used, but which require the purchase of additional licenses or the like for their use.

In step S6, possible routes to the destination detected in step S2 are then determined. As is known per se from the field of navigation systems, various possible routes can be determined, with optimization taking place with regard to various criteria, for example with regard to the time required, with regard to the distance, with regard to the fuel consumption and so on. During the determination of the routes, an additional condition that can be used is that suitable determining software modules are available locally, are available without a license, and/or are available at all for as many route sections or positions lying on the route. In step S7, the various routes can be made available to a user for selection via the user interface. In step S8, it is checked whether all the software modules selected for the different positions of the selected route are stored locally in the motor vehicle. If this is the case, the method can be continued directly with step S13, in which the assisted or at least semi-automated driving of the motor vehicle is started.

If not all software modules are stored locally, it can be checked in step S9 whether licenses are already available for all selected software modules. If this is not the case, a user can be asked in step S10 to confirm a purchase of corresponding licenses. If they do not wish to do this, the method can be repeated from step S6 and another route can be determined. Otherwise, the download of the selected software modules that are not yet available locally can be started by the vehicle-external device.

In step S11, it is checked whether the connection quality for the route planned in step S6 and selected in step S7 is likely to be sufficient to download the selected software modules for route sections to be traveled later during the trip. If the connection quality is sufficient, the waiting condition in step S11 is not met, and the method can be continued directly with step S13. Otherwise, there is a wait in step S12 until all selected software modules have been downloaded from the vehicle-external device or are stored locally in the motor vehicle before the driving operation is started in step S13.

The discussion regarding FIG. 3 was based on the assumption that all sections of the routes can always be driven on with suitably selected software modules, at least when the corresponding licenses are purchased. If this is not the case, as already explained in relation to FIG. 2, the driver can be asked to drive the vehicle himself in the corresponding sections; an assistance request can be sent out with regard to remote control of the vehicle or the boarding of an external driver, or a fallback software module can be used, in order to allow at least limited operation of the motor vehicle without driver intervention.

The invention claimed is:

1. A method of driving a motor vehicle, comprising:
   determining position data relating to at least one of a current position or a predicted future position of the motor vehicle;
   detecting, using at least one sensor device, surroundings data relating to a surrounding environment of the motor vehicle;
   determining, based on the surroundings data, at least one driving intervention;
   controlling at least one vehicle system of the motor vehicle to execute the at least one driving intervention,
      wherein the at least one driving intervention is executed by a selected software module that is selected based on the surroundings data, and
      wherein the selected software module is selected from a plurality of software modules based on the position data, each software module of the plurality of software modules being configured to execute the at least one driving intervention;
   predicting a future route for the motor vehicle, wherein the future route is predicted based on the predicted future position of the motor vehicle; and
   selecting, based on at least one of the predicted future position of the motor vehicle or a plurality of predicted future positions of the motor vehicle on the future route, at least one future software module from the plurality of software modules,
      wherein the method of driving the motor vehicle along the predicted future route is executed if a waiting condition is fulfilled,
      wherein at least one of a current connection quality or a predicted connection quality of a wireless communication connection affects fulfillment of the waiting condition, and
      wherein the waiting condition is fulfilled when the selected software module and the at least one future software module are selected by a vehicle-external device and stored locally in the motor vehicle.

2. The method according to claim 1, further comprising:
   determining at least one of a probable route type or a probable traffic situation for the current position of the motor vehicle based on the position data,
      wherein the selected software module is selected based on at least one of the probable route type or the probable traffic situation.

3. The method according to claim 1,
   wherein the at least one driving intervention is determined by a processing device of the motor vehicle, and wherein the selected software module is selected by the vehicle-external device via the wireless communication connection prior to the determination of the at least one driving intervention.

4. The method according to claim 1, wherein, in the event that only a subset of software modules from the plurality of software modules is available, predicting the future route is based on the available subset of software modules.

5. The method according to claim 4, further comprising:
controlling a notification device to inform a user that manual driving of the motor vehicle is required for at least one of the current position or the predicted future position of the motor vehicle on the future route when an intervention condition is met; and
sending a request for assistance to the vehicle-external device when the intervention condition is met,
   wherein the intervention condition indicates that the selected software module for at least one of the current position or the predicted future position on the future route is not available, and
   wherein the intervention condition indicates that no software module in the available subset of software modules is suited for at least one of the current position or the predicted future position on the future route.

6. The method according to claim 1, further comprising:
evaluating, using a monitoring software module, a quality condition, wherein fulfillment of the quality condition depends on the at least one driving intervention determined by the selected software module.

7. The method according to claim 1, wherein the selected software module is selected based on at least one of a specified travel destination, a current travel direction, or a predicted travel direction of the motor vehicle.

8. A motor vehicle, comprising:
a memory for storing instructions; and
one or more processors, communicatively coupled to the memory, configured to execute the instructions, the instructions causing the one or more processors to:
   determine position data relating to at least one of a current position or a predicted future position of the motor vehicle;
   detect, using at least one sensor device, surroundings data relating to a surrounding environment of the motor vehicle;
   determine, based on the surroundings data, at least one driving intervention; and
   control at least one vehicle system of the motor vehicle to execute the at least one driving intervention,
      wherein the at least one driving intervention is executed by a selected software module that is selected based on the surroundings data, and
      wherein the selected software module is selected from a plurality of software modules based on the position data, each software module of the plurality of software modules being configured to execute the at least one driving intervention;
   predict a future route for the motor vehicle, wherein the future route is predicted based on the predicted future position of the motor vehicle; and
   select, based on at least one of the predicted future position of the motor vehicle or a plurality of predicted future positions of the motor vehicle on the future route, at least one future software module from the plurality of software modules,
      wherein the method of driving the motor vehicle along the future route is executed if a waiting condition is fulfilled,
      wherein at least one of a current connection quality or a predicted connection quality of a wireless communication connection affects fulfillment of the waiting condition, and
      wherein the waiting condition is fulfilled when the selected software module and the at least one future software module are selected by a vehicle-external device and stored locally in the motor vehicle.

* * * * *